US012682869B2

(12) United States Patent
Yu

(10) Patent No.: US 12,682,869 B2
(45) Date of Patent: Jul. 14, 2026

(54) IMAGE DISPLAY DEVICE HAVING DELAY TIME SETTING FUNCTION AND METHOD THEREOF

(71) Applicant: VIZION Corporation, Seoul (KR)

(72) Inventor: Alan Tun Hsun Yu, Fremont, CA (US)

(73) Assignee: VIZION Corporation, Seoul (KR)

( * ) Notice: Subject to any disclaimer, the term of this patent is extended or adjusted under 35 U.S.C. 154(b) by 0 days.

(21) Appl. No.: 19/381,254

(22) Filed: Nov. 6, 2025

(65) Prior Publication Data

US 2026/0134853 A1 May 14, 2026

(30) Foreign Application Priority Data

Nov. 8, 2024 (KR) ........................ 10-2024-0157852

(51) Int. Cl.
*G09G 5/391* (2006.01)

(52) U.S. Cl.
CPC ..... *G09G 5/391* (2013.01); *G09G 2340/0435* (2013.01)

(58) Field of Classification Search
CPC ........................ G09G 5/391; G09G 2340/0435
See application file for complete search history.

(56) References Cited

U.S. PATENT DOCUMENTS

2009/0096769 A1* 4/2009 Kim ..................... G09G 3/2096 345/204
2016/0125813 A1* 5/2016 Park ....................... G09G 3/344 345/107
2018/0007311 A1* 1/2018 Kato ........................ G09G 5/18
2019/0253662 A1* 8/2019 Kim ..................... H04N 7/0127
(Continued)

FOREIGN PATENT DOCUMENTS

KR 10-2008-0109482 A 12/2008
KR 10-1329706 A 11/2013
(Continued)

OTHER PUBLICATIONS

Korean Submission of an Opinion for 10-2024-0157852 dated Feb. 7, 2025.
(Continued)

*Primary Examiner* — Ryan A Lubit
(74) *Attorney, Agent, or Firm* — Sughrue Mion, PLLC

(57) ABSTRACT

An embodiment relates to an image display device having a function of applying a delay time when an input image signal is changed, e.g., a resolution of the image signal is changed, and a method thereof, and when a resolution or an image input source is switched, screen display may be performed smoothly by the image display device including an image input part configured to receive an image signal, a change detection part configured to detect a change in the image signal received through the image input part, a delay time addition part configured to add a predetermined delay time to maintain a blank state when the change detection part detects a change in the image signal, and a blank screen display part configured to switch a display screen to a blank state during the delay time added by the delay time addition part, thereby providing an image display device and method for screen correction of a display device, which enable stable screen transitions without flickering or distortion.

5 Claims, 2 Drawing Sheets

(56) References Cited

U.S. PATENT DOCUMENTS

| | | | | |
|---|---|---|---|---|
| 2020/0211475 | A1* | 7/2020 | Park | G09G 3/2007 |
| 2022/0130317 | A1* | 4/2022 | Lan | G09G 3/3614 |
| 2022/0223097 | A1* | 7/2022 | Lee | G09G 3/2096 |
| 2023/0042768 | A1* | 2/2023 | Choi | G09G 3/3406 |
| 2023/0148307 | A1* | 5/2023 | Lee | G09G 3/32<br>345/60 |
| 2023/0306890 | A1* | 9/2023 | Cho | G09G 3/2092 |
| 2025/0157415 | A1* | 5/2025 | Choe | G09G 3/3233 |

FOREIGN PATENT DOCUMENTS

| | | | | | |
|---|---|---|---|---|---|
| KR | 10-2019-0079330 | A | | 7/2019 | |
| KR | 20190079330 | A | * | 7/2019 | H04M 1/72522 |
| KR | 10-2127970 | A | | 6/2020 | |

OTHER PUBLICATIONS

Korean Written Decision on Registration for 10-2024-0157852 dated Feb. 28, 2025.

* cited by examiner

IMAGE DISPLAY DEVICE HAVING DELAY TIME SETTING FUNCTION AND METHOD THEREOF

CROSS-REFERENCE TO RELATED APPLICATION

This application claims priority to and the benefit of Korean Patent Application No. 10-2024-0157852, filed on Nov. 8, 2024, the disclosure of which is incorporated herein by reference in its entirety.

BACKGROUND

1. Field of the Invention

Embodiments relate to an image display device, and more particularly, to an image display device having a function of applying a delay time and a method thereof in order for alleviating flickering phenomena that occur when an input signal is distorted.

2. Discussion of Related Art

In general, distortion of an input image signal in an image display device refers to various visual errors that occur when the display device fails to properly interpret or output the original signal.

For example, when a refresh rate of the input image signal does not match that of the image display device, screen flickering may occur.

Further, a phenomenon in which a screen flickers may temporarily occur when the image display device fails to properly receive or interpret the input signal due to a long high-definition multimedia interface (HDMI) cable or a weak signal. Such flickering not only causes visual discomfort but also increases a user's fatigue when exposed for a long time.

Further, when a resolution or the like of an input image is changed, the image display device requires time to synchronize the input signal. During this process, the screen may temporarily turn black (blank screen) or display a "No Signal" message. In addition, this state is maintained until a video signal corresponding to a newly adjusted resolution is stably received and processed.

That is, during the signal readjustment process, screen flickering may occur, and when the signal is not completely resynchronized, a "No Signal" message may be displayed. In addition, when the display does not support the set resolution, the signal readjustment may not be completed, and the screen may not be displayed. During this process, a phenomenon in which temporary flickering, distorted images, or a temporary blank screen appears may occur.

In particular, when screen distortion or flickering occurs while monitoring a patient's condition or during a critical moment of a medical procedure, such screen distortion or flickering may cause a serious problem, and, thus, a signal readjustment operation is required when switching screens in precise imaging devices such as surgical systems.

RELATED ART DOCUMENTS

Registered Patent Documents (Patent Document 0001) KR 10-1329706 B1
(Patent Document 0002) KR 10-2127970 B1

SUMMARY OF THE INVENTION

The present invention has been made in view of the above-described technical background and is directed to providing an image display device and method for enabling smooth and stable screen transitions by alleviating flickering phenomena caused by distortion of an input signal.

The present invention includes the following configuration to achieve the above-described objectives.

That is, an image display device according to one embodiment of the present invention is a computer device including one or more processors and a memory storing one or more programs executed by the one or more processors, and includes an image input part configured to receive an image signal, a change detection part configured to detect a change in the image signal received through the image input part, a delay time addition part configured to add a predetermined delay time to maintain a blank screen state when the change detection part detects the change in the image signal, and a blank screen display part configured to switch a display screen to the blank screen state during the delay time added by the delay time addition part.

Meanwhile, an image display method according to one embodiment is performed by a computing device including one or more processors and a memory storing one or more programs executed by the one or more processors, and includes an image input operation of receiving an image signal, a change detection operation of detecting a change in the image signal input in the image input operation, a delay time addition operation of adding a predetermined delay time to maintain a blank screen state when the change in the image signal is detected in the change detection operation, and a blank screen display operation of switching a display screen to the blank screen state during the delay time added in the delay time addition operation.

BRIEF DESCRIPTION OF THE DRAWINGS

The above and other objects, features, and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
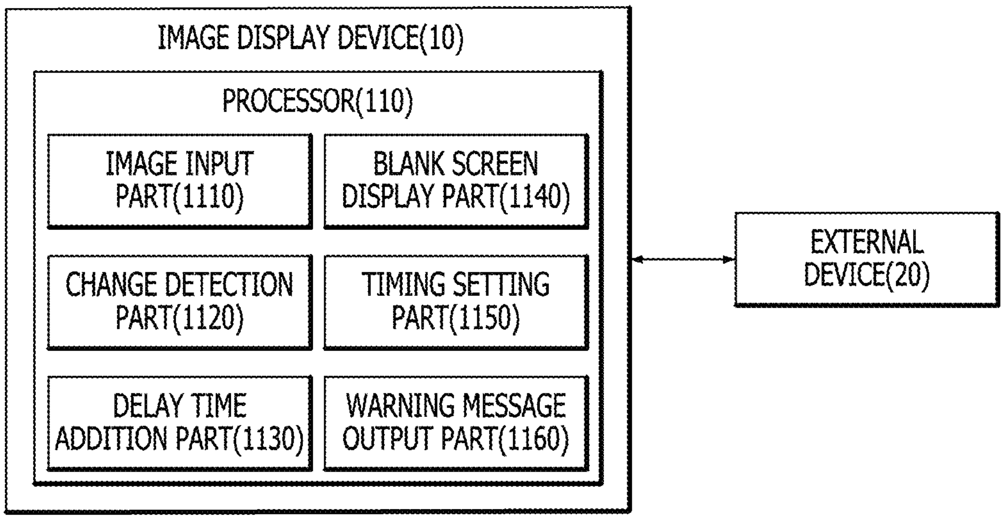
FIG. 1 is a block diagram for describing a configuration of an image display device according to one embodiment of the present invention.

It should be noted that the technical terms used in the present invention are used merely to describe specific embodiments and are not intended to limit the present invention. In addition, unless otherwise specifically defined in the present invention, the technical terms used in the present invention should be interpreted as having meanings commonly understood by those skilled in the art to which the present invention pertains, and should not be construed as having excessively comprehensive meanings or excessively reduced meanings.

Hereinafter, exemplary embodiments according to the present invention will be described in detail with reference to the accompanying drawings.

An image display device according to embodiments of the present invention may be implemented by at least one computer device, and an image display method according to embodiments of the present invention may be performed through at least one computer device included in the image display device. In this case, a computer program according to one embodiment of the present invention may be installed and executed on the computer device, and the computer device may perform the image display method according to embodiments of the present invention under the control of the computer program. The above-described computer program may be stored in a computer-readable recording medium that is combined with the computer device to execute the image display method on a computer.

One embodiment of an image display device relates to a signal loss delay. When a change in an input signal being monitored is detected, an output image is continuously maintained, and when the change in the signal is detected even after a specific time has elapsed, a screen becomes blank, and the state thereof is switched to a no-signal state.

The image display device according to one embodiment includes a special detection delay logic for preventing artifacts of an external system that may occur when a resolution is changed based on timing detection. For example, a delay of 100 ms may be added before switching the screen to a blank state in order to prevent flickering of the image display device.

When the resolution is changed, a display system or an externally connected device that outputs an image undergoes a signal readjustment process, during which a phenomenon such as temporary flickering, distorted images, or blank screens may occur on the display.

The image display device according to one embodiment uses a detection delay logic to prevent the screen from changing abruptly when the resolution is changed, and waits for a certain period of time until the screen transitions to a stable state. As an example, by adding a delay of 100 ms, the screen may be adjusted to transition stably without immediately flickering when the resolution is changed.

In addition, the image display device may further include a special logic for preventing signal resynchronization that may occur when a mode is changed to an image rotation mode, a zoom mode, or a picture-in-picture (PIP)/picture-by-picture (PBP) mode based on timing detection.

Further, the image display device may include a special logic configured to enable or disable a timing table function for ensuring compatibility with various external system timings based on timing detection, and may display that a graphics user interface (GUI) is not supported when a clock of a digital visual interface (DVI) port exceeds 330 MHz through timing detection.

FIG. 1 is a block diagram for describing a configuration of the image display device according to one embodiment of the present invention.

As illustrated in FIG. 1, an image display device 10 according to one embodiment includes a processor 110, which includes an image input part 1110, a change detection part 1120, a delay time addition part 1130, a blank screen display part 1140, a timing setting part 1150, and a warning message output part 1160.

One embodiment of the image display device 10 relates to a signal loss delay. When a change in an input signal being monitored is detected, an output image may be continuously maintained, and when the change in the signal is detected even after a specific time has elapsed, a screen may become blank, and the state thereof may be switched to a no-signal state.

In one embodiment, the image display device 10 may be implemented as a monitor, a television, a projector, or the like. However, the present invention is not limited thereto.

The image input part 1110 receives various image signals from an external device 20 for transmitting video outputs. The image input part 1110 may use various interfaces to transmit the video outputs of the external device 20.

For example, the interfaces may include a high-definition multimedia interface (HDMI) capable of transmitting high-resolution video and audio through a single cable, a digital visual interface (DVI) for transmitting digital signals between a computer and a monitor, a video graphics array (VGA) for transmitting analog signals, a DisplayPort serving as a high-bandwidth digital interface, and a technology for transmitting video signals through a Universal Serial Bus (USB) Type-C port.

In one embodiment, the processor 110 may interpret the input image signal and perform resolution processing, refresh rate processing, and color and brightness adjustment in outputting the image on the screen.

In the resolution processing, a resolution (e.g., 1920×1080, 4K) of the input signal may be recognized, and the screen may be adjusted accordingly. In addition, a screen refresh speed may be adjusted to match a refresh rate (e.g., 60 Hz, 120 Hz, or the like) used by the external device 20.

In addition, the image signal input from the external device 20 may undergo a synchronization process, and pixels may be displayed in a correct order through horizontal and vertical synchronization of the screen.

The change detection part 1120 detects changes in the image signal received through the image input part 1110.

In one aspect, the change detection part 1120 detects at least one change among a resolution change of the received image signal, a switching of an image source, and a reset of a frequency or timing of the device. However, the present invention is not limited thereto.

The change detection part 1120 may detect at least one change among the resolution change of the received image signal, the switching of an image source, and the reset of a frequency or timing of the device so that the image display device 10 can recognize and respond in real time when a main parameter of the image signal is changed.

The change detection part 1120 may detect the resolution change by detecting a change in the number of pixels of a video signal transmitted from the external device 20 when the resolution is changed. The resolution is defined by the number of pixels arranged vertically and horizontally on the screen, and, for example, a change from 1920×1080 (full HD) to 3840×2160 (4K) may be detected.

In addition, the change detection part 1120 detects whether an image source is switched depending on whether a switching occurs from one of a plurality of input sources such as HDMI, DisplayPort, and DVI to another.

For example, a case in which the source is switched from HDMI1 to HDMI2 or from VGA to HDMI may correspond to such image source switching.

The change detection part 1120 may also detect whether a frequency (refresh rate) of signals of the external device 20, which may affect the smoothness of an image, is changed. For example, when the refresh rate is changed from 60 Hz to 120 Hz, the screen may be displayed more smoothly, and the change detection part 1120 may detect such a change in the refresh rate.

In one embodiment, the change detection part 1120 may use a timing detection circuit or extended display identification data (EDID) information to immediately detect changes in resolution, refresh rate, source switching, and the like.

When the change detection part 1120 detects a change in an image signal, the delay time addition part 1130 adds a predetermined delay time to maintain the blank screen state. That is, a predetermined time optimized for maintaining the blank state may be determined for each factor of change in the image signal.

In this case, the delay time addition part 1130 may identify factors of change in the image signal detected by the change detection part 1120 and apply different predetermined delay times for maintaining the blank screen state for each identified factor according to preset criteria. Accordingly, an optimized delay time may be provided depending on each situation.

The delay time addition part 1130 may determine a predetermined delay time for maintaining the blank state for each factor of change in the image signal.

For example, when a resolution is changed, a video signal synchronization process between the external device 20 and the image display device 10 is required, which generally takes a short period of time, and a delay time of about 100 ms may typically be required. That is, the delay time addition part 1130 may determine a delay time for ensuring a stable signal transition within a range of 50 ms to 200 ms depending on the magnitude of the resolution change.

In addition, when a refresh rate (frame rate) is changed, a delay time shorter than that for the resolution change is required, and a delay time may be determined as one of values within a range of 50 ms to 100 ms.

In addition, when an input source is changed, a longer delay time may be required for switching between different formats (for example, from HDMI to DVI), and a delay time may be determined as one of values within a range of 100 ms to 500 ms so that a new signal can be stably received.

In addition, when a PIP or PBP mode is used, a signal adjustment for simultaneously processing multiple screens is required, and a delay time may be determined as one of values within a range of 200 ms to 500 ms.

In particular, when a screen division setting is performed, since it takes a time until signals of the respective screens are stably processed, the delay time may be implemented to be set longer during the screen division.

At this point, the delay time addition part 1130 may determine a predetermined time for maintaining the blank state for each factor of change in the image signal by using a deep learning algorithm.

That is, to collect data on various factors of change in the image signal, the time required for screen transitions may be measured in various scenarios such as resolution changes, refresh rate adjustments, source switching, and timing readjustments.

In addition, based on the collected data, a deep learning model is trained to derive an algorithm that receives inputs related to the factors of change in the image signal and outputs an optimal delay time.

That is, the deep learning model may be constructed such that the input data may include a magnitude of resolution change, a magnitude of refresh rate change, a type of input source, and characteristics of the display device and its output corresponds to the time for maintaining the blank state. The trained deep learning model may process image signal change data input in real time, determine how long the blank state should be maintained, and dynamically apply an accurate delay time during screen transition.

Accordingly, customized optimization can be provided according to various user environments and system specifications, thereby deriving dynamic and optimized delay times for respective situations.

The blank screen display part 1140 switches the display screen to a blank state during the delay time added by the delay time addition part 1130.

The blank screen display part 1140 maintains the screen in a black screen (black screen) state during the added delay time when a signal cannot be temporarily processed while undergoing processes such as resolution change, input source switching, refresh rate change, or timing readjustment. Accordingly, by applying the delay time and switching to the blank state, immediate screen output during a resolution change may be prevented from causing visual discomfort, such as flickering, screen blank, or distortion, to a user.

Since a received image signal may become unstable while the image display device 10 converts the signal to a new resolution, a delay time may be applied to prevent such instability. During the delay time, the image display device 10 may adjust the frequency, ratio, and pixel arrangement of the signal to match the new resolution, or may display an image after confirming the stability of the input signal.

For example, when the resolution is changed or the input source is switched, the image display device 10 may maintain the blank state for a period of time required to readjust the timing of the video signal between the image display device 10 and the external device 20, thereby maintaining the black screen until the signal is completely stabilized and providing a time necessary for the display to receive a new signal.

During a process of readjusting a pixel processing speed and signal timing when the resolution is changed or the refresh rate is adjusted, the image display device may temporarily be unable to receive an image signal. In such a case, instead of displaying flickering or distortion on the screen, the screen may be switched to a black screen to intuitively indicate to the user that a transition is in progress.

In addition, the blank screen display part 1140 may switch the screen to a blank state for a preset delay time even when horizontal and vertical synchronization timing is changed or when a timing table of a video signal is reset.

In an additional aspect, the blank screen display part 1140 may be implemented to use a frame buffer to retain a previous frame and prepare in advance for processing a new signal while the signal is being changed. That is, instead of a black blank screen, the previous frame may be displayed in a blank screen space. Accordingly, after the new signal is processed, the image may be immediately output on the screen, and screen transitions during processes such as video signal switching or resolution change may be performed more smoothly and seamlessly.

The frame buffer is a memory space that temporarily stores pixel data to be displayed on the screen, stores all pixel information of the current screen and is updated whenever each frame is changed.

In one embodiment, when the signal, resolution, or refresh rate is changed, the system may use the frame buffer to retain a previous frame, and the blank screen display part 1140 may use the retained frame while the screen is being switched to a blank state. That is, until a new signal is processed, data of the previous frame may be displayed on the blank screen so that the screen is not suddenly turn off or flickers.

The timing setting part 1150 identifies a resolution or refresh rate of the image signal received through the image input part 1110 and selects or disables a timing table according to the resolution or refresh rate, based on the timing table.

At this time, when the change detection part 1120 detects a change in any one of an image rotation mode, a zoom mode, and a PIP/PBP mode, the timing setting part 1150 maintains or adjusts an existing image signal timing based on a frequency or timing change of the image signal received through the image input part 1110.

In one embodiment, the timing setting part 1150 holds a timing table in which timing information of signals that can be input to the image display device 10 from various external devices 20 is predefined.

In this case, the timing table may accurately identify timings of signals input from the respective external devices 20 based on information such as resolution information output by each external device 20, refresh rate information used by each external device 20, horizontal and vertical synchronization information, and clock frequencies to be used for each resolution, and may process the received image signals accordingly.

The timing setting part 1150 may dynamically apply the timing table by selecting or disabling the timing table, thereby ensuring various timing compatibilities.

As an example, in a situation in which one or more external devices 20, such as surgical devices or professional imaging equipment, are connected, the timing table may automatically select timings suitable for the respective external devices 20. Accordingly, compatibility between devices may be improved, and the stability of the signal may be ensured.

Meanwhile, when the external device 20 uses a non-standard resolution or refresh rate that is not defined in the timing table, the timing table function may be disabled to flexibly perform signal processing. That is, the image display device may respond by manually analyzing the signal and setting an appropriate timing.

Further, as an example, in a case in which a specific external device 20, such as a special surgical device or an industrial device, has unique timing requirements, the timing table function may be disabled so that the signal can be processed without any change. Accordingly, compatibility with the special device may be maintained.

In an additional aspect of the present invention, when pixels per second for data of an image signal input to a DVI port of the image input part 1110 reach a threshold, the warning message output part 1160 outputs a message indicating that a GUI is not supported.

In one embodiment, the warning message output part 1160 provides a function for responding to a situation in which a bandwidth limit of the DVI port is exceeded. That is, when the amount of pixel data processing supported by the DVI interface is exceeded, a warning message is displayed so that the user can recognize the situation.

The DVI port has a bandwidth limitation in transmitting pixels per second for data. This bandwidth is determined according to factors such as a resolution, a refresh rate, and a color depth, and the amount of data that can be processed may vary depending on whether the DVI is a single-link DVI or a dual-link DVI.

Specifically, the single-link DVI can handle a pixel clock of up to approximately 165 MHz, which can support a resolution of about 1920×1200 at a refresh rate of 60 Hz. In addition, the dual-link DVI can handle a pixel clock of up to approximately 330 MHz, which can support a resolution of 2560×1600 at 60 Hz.

Accordingly, when a received image signal exceeds this bandwidth, pixel data cannot be processed, and problems may occur in screen output.

The warning message output part 1160 may allow the display device to detect and recognize that a threshold has been reached when pixels per second (pixel clock) for data exceeds the maximum processing capacity of the DVI port. In this case, the threshold may generally be set to 330 MHz (based on a dual-link DVI), which represents the bandwidth limit of the DVI.

When the DVI port fails to normally process a signal due to an overload of pixel data, the GUI may not be normally displayed. Accordingly, the warning message output part 1160 may display a warning message indicating that a GUI is not supported.

For example, a message may be output to notify that the currently set resolution or refresh rate exceeds processing capability of the DVI port and to induce the user to lower and reset the resolution or refresh rate.

The warning message output part 1160 may monitor the speed of pixel data input to the DVI through a pixel clock detector provided in the image display device 10, and may output a warning message when the pixel clock exceeds a threshold.

In addition, the warning message output part 1160 may be implemented to determine whether the current signal is normal based on the maximum bandwidth of the DVI port by utilizing the timing table. Since the timing table includes information on supported resolutions and refresh rates, the warning message output part 1160 may be implemented to output a warning message when the current signal deviates from the supported range defined in the timing table.

Additionally, the warning message output part 1160 may monitor a connection state between the image display device 10 and the external device 20, and may output various warning messages according to signal quality, compatibility, and hardware conditions, thereby improving user experience.

For example, when the external device 20 transmits a signal having a refresh rate that is not supported by the image display device 10, the warning message output part 1160 may further output a warning message. That is, when the refresh rate exceeds a physical limit of the image display device 10 or is not supported by hardware, the warning message output part 1160 may output a warning message to induce the user to lower the refresh rate.

Further, when the image display device 10 or a graphic card is overheated during the processing of a high-resolution or high-refresh-rate signal, and there is a risk of performance degradation or system damage, the warning message output part 1160 may output a warning message to induce the user to lower the resolution or refresh rate.

Figure 2:
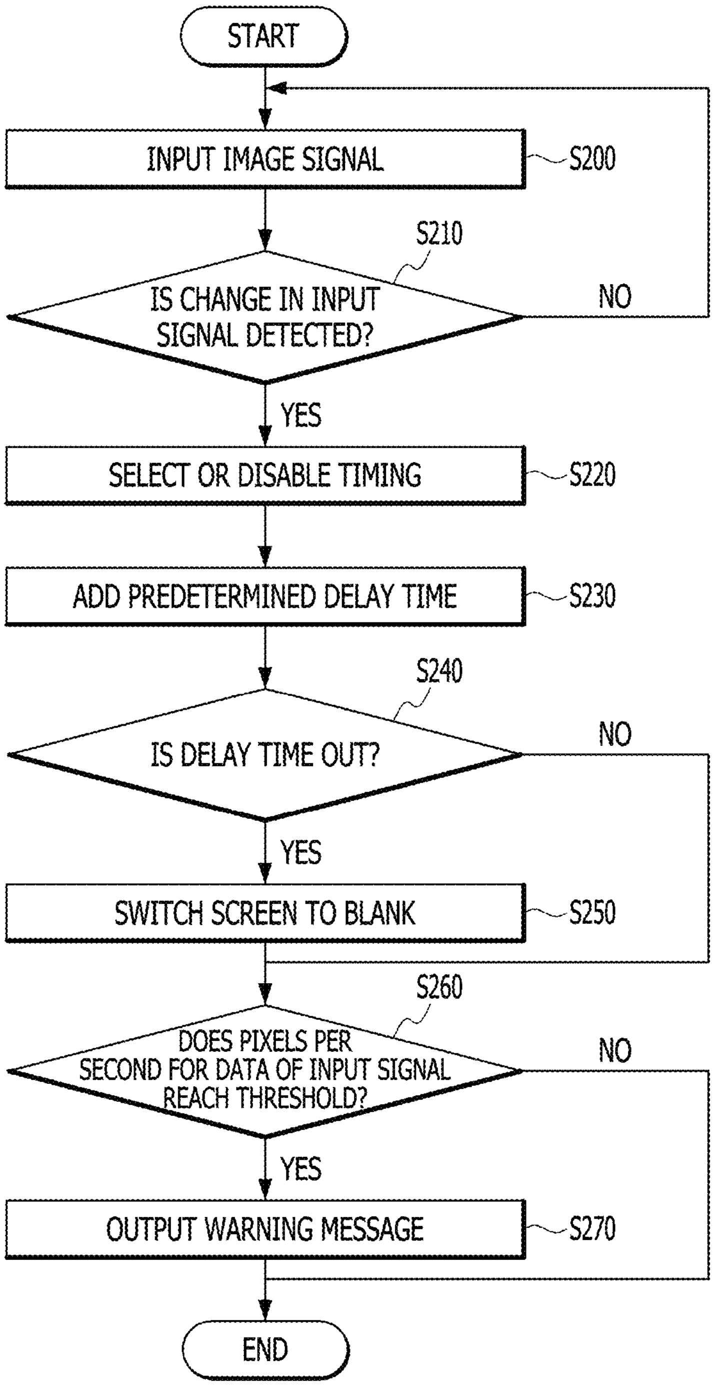
FIG. 2 is a flowchart for describing an image display method according to one embodiment of the present invention.

FIG. 2 is a flowchart for describing an image display method according to one embodiment of the present invention.

The image display method according to one embodiment includes an image input operation S200 of receiving the image signal. In the image input operation, various interfaces may be used to receive the image signal from the external device.

In addition, when a change in the image signal is detected in the image input operation (S210), a predetermined delay time is added to maintain a blank state of the screen (S230).

In this case, detecting a change includes detecting at least one of a resolution change of the received image signal, a switching of an image source, and a reset of a frequency or timing of the device.

In one embodiment, detecting a change in the image signal may include detecting at least one of the resolution change of the received image signal, the switching of an image source, and the reset of a frequency or timing of the device so that the image display device can recognize and respond to a change in main parameters of the received image signal in real time.

Detecting a change in the image signal may include detecting whether an image source is switched among a plurality of input sources such as HDMI, DisplayPort, and DVI, or detecting whether a frequency (refresh rate) from the external device, which may affect the smoothness of the image, is changed.

Detecting a change in the image signal may also include immediately detecting changes in resolution, refresh rate, source switching, and the like by using a timing detection circuit or EDID information.

In one embodiment, in a delay time addition operation, a predetermined time for maintaining the blank state for each factor of change in the image signal may be determined using a deep learning algorithm.

That is, to collect data on various factors of change in the image signal, the time required for screen transitions may be measured in various scenarios such as resolution changes, refresh rate adjustments, source switching, and timing readjustments.

In addition, based on the collected data, a deep learning model is trained to derive an algorithm that receives inputs related to the factors of change in the image signal and outputs an optimal delay time.

That is, the deep learning model may be constructed such that the input data may include a magnitude of resolution change, a magnitude of refresh rate change, a type of input source, and characteristics of the display device and its output corresponds to the time for maintaining the blank state. The trained deep learning model may process image signal change data input in real time, determine how long the blank state should be maintained, and dynamically apply an accurate delay time during screen transition.

Accordingly, customized optimization can be provided according to various user environments and system specifications, thereby deriving dynamic and optimized delay times for respective situations.

In addition, the resolution or refresh rate of the image signal received in the image input operation may be identified, and the timing may be set by selecting or disabling a timing based on a timing table according to the resolution or refresh rate (S220).

When a change in any one of an image rotation mode, a zoom mode, and a PIP/PBP mode is detected in the change detection operation, in the timing setting operation S220, the existing image signal timing may be maintained or adjusted based on a frequency or timing change of the image signal received through the image input part.

In one embodiment, in the delay time addition operation, factors of change in the image signal detected in the change detection operation may be identified, and different predetermined delay times for maintaining the blank state may be applied for each identified factor of change in the image signal according to preset criteria.

Thereafter, the display screen may be switched to the blank state (S250) during the delay time added in the delay time addition operation (S240).

In addition, when pixels per second for data of an image signal received through a DVI port in the image input operation reach a threshold (S260), a message indicating that a GUI is not supported is output (S270).

When the pixels per second (pixel clock) for data exceeds the maximum processing capacity of the DVI port, the display device may detect this and recognize that the threshold has been reached in a warning message output operation. In this case, the threshold may generally be set to 330 MHz (based on a dual-link DVI), which represents the bandwidth limit of the DVI.

When the DVI port fails to normally process a signal due to an overload of pixel data, the GUI may not be normally displayed. Accordingly, in the warning message output operation, a warning message indicating that a GUI is not supported may be displayed.

The above-described method may be implemented as an application or in the form of program instructions executable through various computer components, and may be recorded on a computer-readable recording medium. The computer-readable recording medium may include program instructions, data files, data structures, and the like alone or in a combination thereof.

The program instructions recorded on the computer-readable recording medium may be specially designed and configured for the present invention or may be available by those skilled in the art of computer software.

Examples of the computer-readable recording medium include hardware devices specially configured to store and execute program instructions, including magnetic media such as a hard disk, a floppy disk, and a magnetic tape, optical media such as a compact disc read-only memory (CD-ROM) and a digital versatile disk (DVD), magneto-optical media such as a floptical disk, and solid state drives such as a read-only memory (ROM), a random access memory (RAM), and a flash memory.

Examples of the program instructions include machine language codes generated by a compiler as well as high-level language codes which are executable by a computer using an interpreter or the like. The hardware devices may be modified with one or more software modules to perform processing in accordance with the present invention, and vice versa.

According to one embodiment of the present invention, an effect in which an image display device and method for screen correction of a display device are provided can be achieved, thereby enabling smooth and stable screen transitions by alleviating flickering phenomena caused by distortion of an input signal.

Although embodiments of the present invention have been described above, it may be understood by those skilled in the art that a variety of modifications and changes may be made without departing from the concept and scope of the present invention disclosed within the range of the following claims.

What is claimed is:

1. An image display device that is a computer device including one or more processors and a memory storing one or more programs executed by the one or more processors, the image display device comprising:

an image input part configured to receive an image signal;

a change detection part configured to detect a change in the image signal received through the image input part;

a delay time addition part configured to add a predetermined delay time to maintain a blank screen state when the change detection part detects the change in the image signal; and a blank screen display part configured to switch a display screen to the blank screen state during the delay time added by the delay time addition part, wherein the change detection part detects at least one of a resolution change of the received image signal, a switching of an image source, and a reset of a frequency or timing of the device, and the delay time addition part identifies factors of change in the image signal detected by the change detection part and applies different predetermined delay times for maintaining the blank screen state according to preset criteria for each identified factor.

2. The image display device of claim 1, further comprising a timing setting part configured to identify a resolution or a refresh rate of the image signal received through the image input part and select or disable the timing according to the resolution or the refresh rate based on a timing table.

3. The image display device of claim 2, wherein, when the change detection part detects a change in any one of an image rotation mode, a zoom mode, and a picture-in-picture (PIP)/picture-by-picture (PBP) mode, the timing setting part maintains or adjusts an existing image signal timing based on a frequency or timing change of the image signal received through the image input part.

4. The image display device of claim 1, further comprising a warning message output part configured to output a message indicating that a graphics user interface (GUI) is not supported when pixels per second for data of an image signal received through a digital visual interface (DVI) port of the image input part reach a threshold.

5. An image display method that is performed by a computing device including one or more processors and a memory storing one or more programs executed by the one or more processors, the image display method comprising:

an image input operation of receiving an image signal;

a change detection operation of detecting a change in the image signal input in the image input operation;

a delay time addition operation of adding a predetermined delay time to maintain a blank screen state when the change in the image signal is detected in the change detection operation; and a blank screen display operation of switching a display screen to the blank screen state during the delay time added in the delay time addition operation, wherein, in the change detection operation, at least one of a resolution change of the received image signal, a switching of an image source, and a reset of a frequency or timing of the device is detected, and in the delay time addition operation, factors of change in the image signal detected in the change detection operation are identified, and different predetermined delay times for maintaining the blank screen state are applied according to preset criteria for each identified factor.

* * * * *